United States Patent [19]

Rahnke

[11] Patent Number: 4,510,754
[45] Date of Patent: Apr. 16, 1985

[54] TURBOCHARGER AND EXHAUST GAS CONTROL THEREFOR

[75] Inventor: Christian J. Rahnke, Orchard Lake, Mich.

[73] Assignee: Ford Motor Company, Dearborn, Mich.

[21] Appl. No.: 500,488

[22] Filed: Jun. 2, 1983

[51] Int. Cl.³ .............................................. F02B 37/00
[52] U.S. Cl. ..................................................... 60/602
[58] Field of Search .................. 60/600, 601, 602, 603

[56] References Cited

U.S. PATENT DOCUMENTS

| | | | |
|---|---|---|---|
| 1,816,787 | 7/1931 | Moss | 60/602 |
| 2,825,532 | 3/1958 | Kadosch | 415/147 |
| 3,270,495 | 9/1966 | Connor | 60/602 |
| 3,557,549 | 1/1971 | Webster | 60/602 |
| 4,406,125 | 9/1983 | Rahnke | 60/602 |
| 4,424,675 | 1/1984 | Ojima | 60/602 |

FOREIGN PATENT DOCUMENTS 799675 4/1973 United Kingdom ......... 415/DIG. 1

Primary Examiner—Douglas Hart
Attorney, Agent, or Firm—Frank G. McKenzie; Donald J. Harrington

[57] ABSTRACT

An internal combustion engine has an air-fuel mixture compressed through operation of a turbocharger whose turbine is driven by the exhaust gas from the engine and whose compressor is driven by the turbine. The pressure within the intake manifold is used to produce a signal by means of which the winding of a solenoid-operated direction valve is energized. A flapper valve located within the exhaust gas manifold opens and closes passages within the turbine casing through operation of the solenoid valve. A piston actuates the flapper valve in accordance with intake manifold pressure. Exhaust gas is directed either entirely at high speed through a first passage or at low speed through a second passage, the cross sectional area of the first passage being substantially less than that of the second passage.

14 Claims, 11 Drawing Figures

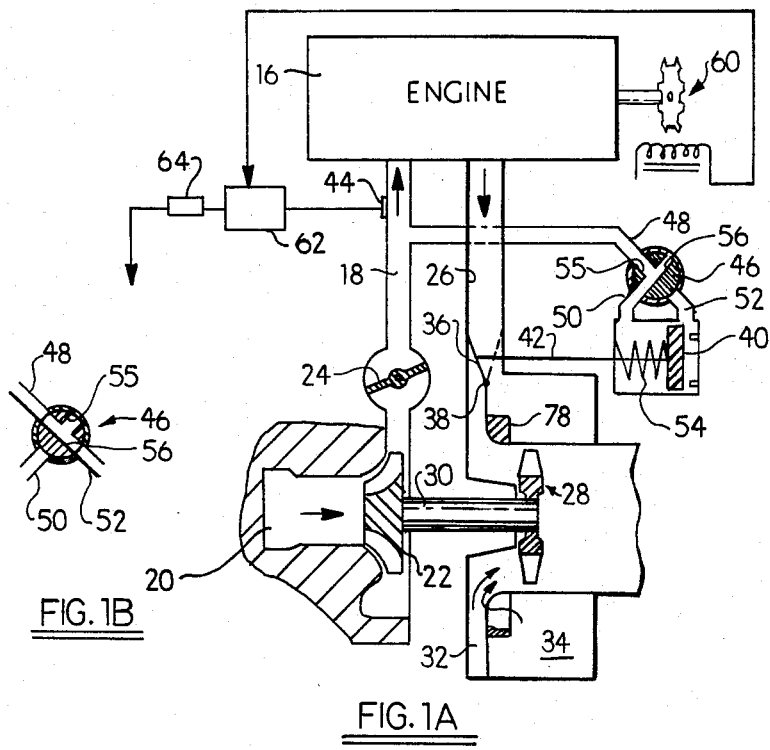
FIG. 1B
FIG. 1A
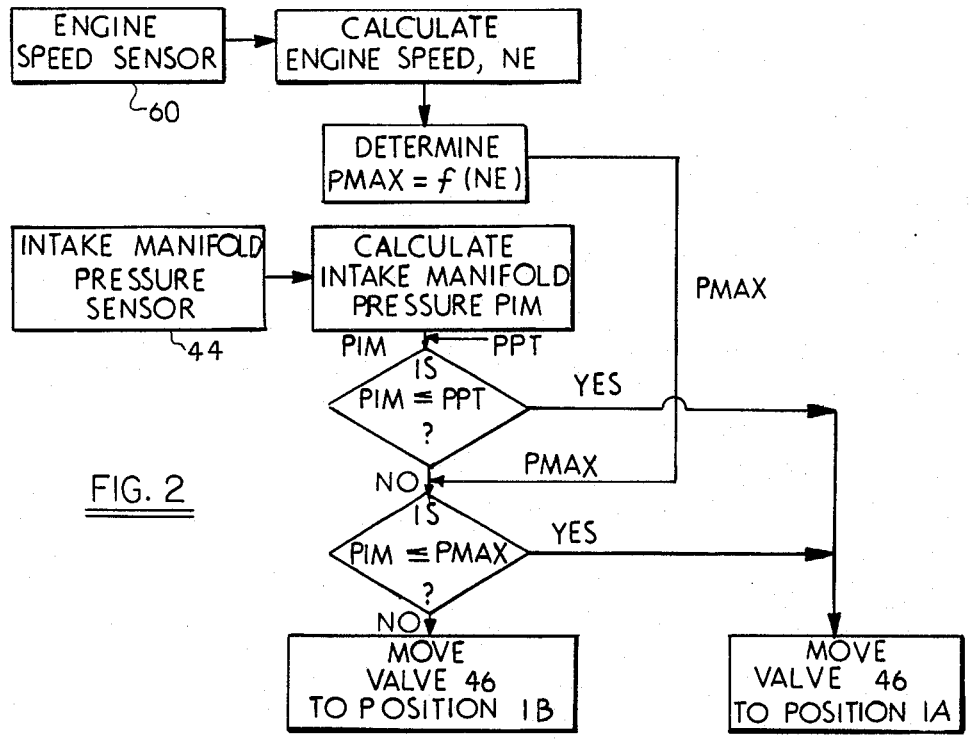
FIG. 2

TURBOCHARGER AND EXHAUST GAS CONTROL THEREFOR

BACKGROUND OF THE INVENTION

1. Field of the Invention

This invention relates to the field of turbochargers for use with internal combustion engines. More particularly, the invention pertains to the exhaust gas admission system of a turbocharger and to systems for controlling the exhaust gas admission.

2. Description of the Prior Art

A turbocharger for use with an automotive engine generally includes a compressor rotor mounted on one end of a driveshaft and a turbine rotor mounted on the shaft at the opposite end. The air-fuel mixture enters the compressor from the carburetor, is compressed, and passed through the intake manifold of the engine. The exhaust gas produced by the engine has substantially greater volume, temperature and energy than the inducted air. The turbine converts the energy of the exhaust gas to drive the compressor, which boosts the pressure of the air-fuel mixture before it is inducted by the engine. In this way, a turbocharged engine will have a greater mass of air delivered to the engine than will a naturally aspirated system, more fuel can be burned and more power can be produced by the engine. The increase in power is used to accelerate the vehicle at a fast rate from a low engine speed condition.

Normally, the turbine of the turbocharger is sized so that high turbine speed results when the engine is operating at low speed. The flow rate of exhaust gas from the engine and passing through the turbine produces high turbine and compressor speed, high enough so that a sufficient boost in intake manifold pressure at low engine speed results. However, when engine speed increases, the flow rate of exhaust gas will increase the speed of the turbine and compressor and can produce such a large increase in intake manifold pressure that the engine could be damaged. For this reason turbochargers are often equipped with a wastegate which opens at high engine speed and bypasses a portion of the exhaust gas flow around the turbine so that the speed of the turbocharger is kept low and intake manifold pressure is maintained below a critical value. Without a wastegate in an engine equipped with a turbocharger, whose size is set to produce full boost when the engine speed is moderate, excessive engine back pressure and the associated power loss at high engine speed would necessarily result. If a wastegate is not used and the turbine is sized to produce maximum boost at low engine speed, high back pressure losses operate to reduce the efficiency of the engine system and structural damage to the engine can result.

SUMMARY OF THE INVENTION

These problems are overcome through the use of turbocharger control systems according to the present invention. Here the turbocharger turbine is sized so that maximum boost is produced at wide open throttle conditions when engine speed is low. The speed of the turbocharger driveshaft is such that the pressure in the intake manifold is sufficient to increase the power output of the engine without exceeding a critical intake manifold pressure. The exhaust gas volute that carries exhaust gas from the engine to the turbine of the turbocharger defines first and second passages which are selectively opened and closed to the engine exhaust by a flapper valve and its associated control system. The first passage has a cross sectional flow area that is substantially less than that of the second passage. When engine speed is low and with the throttle wide open or nearly so, all of the engine exhaust gas passes through the first passage and into the turbine. Then the flow rate of exhaust gas through the turbine is high and the compressor rotor causes a rapid boost in inlet manifold pressure so that an increase in power output by the engine is produced at low engine speed. The turbine is relatively small and is characterized by fast response at full boost at low engine speeds.

As the throttle opening changes and depending on the magnitude of inlet manifold pressure, the flapper valve is moved from the first to the second position through cooperation of the intake manifold pressure, which acts on an actuating piston and a direction control valve, whose state is determined by a control system. The solenoid-actuated direction valve is moved between first and second states through operation of the control system and its control logic. This rotary valve directs intake manifold pressure to one or the other side of the actuating piston so that the position of the flapper valve changes in accordance with the solution of an algorithm that is repetitively executed by a computer which is part of the control system.

If intake manifold pressure exceeds a critical value, the engine exhaust is closed to the first passage and opened to the second passage through operation of the flapper valve. The flow rate through the turbine is reduced substantially from the flow rate through the first passage when the engine is operated at low engine speed. Therefore, the turbine and compressor speeds are reduced sufficiently so that little or no boost in inlet manifold pressure results.

At partial throttle settings, a large pressure drop across the carburetor results and intake manifold pressure decreases substantially below atmospheric pressure. Then, the control system of this invention moves the solenoid-operated directional valve so that intake manifold pressure is communicated to the opposite side of the actuating cylinder and the flapper valve closes the first passage and opens the second passage. Therefore, at partial or closed throttle conditions, the flow rate of exhaust gas through the turbine produces low turbine and compressor speed, the exhaust system back pressure is maintained low and the turbocharger is inoperative in producing intake manifold boost. This operation is consistent with the function of a partially open throttle valve which likewise tends to reduce the flow of air or the air-fuel mixture into the intake manifold.

BRIEF DESCRIPTION OF THE DRAWINGS

FIG. 1A is a schematic diagram of a turbocharger and the exhaust gas control system according to the present invention;

FIG. 1B shows a second position of a outlet valve

FIG. 2 is a logic diagram of the control algorithm whose result determines the state of the direction valve;

DESCRIPTION OF THE PREFERRED EMBODIMENT

Figure 3:
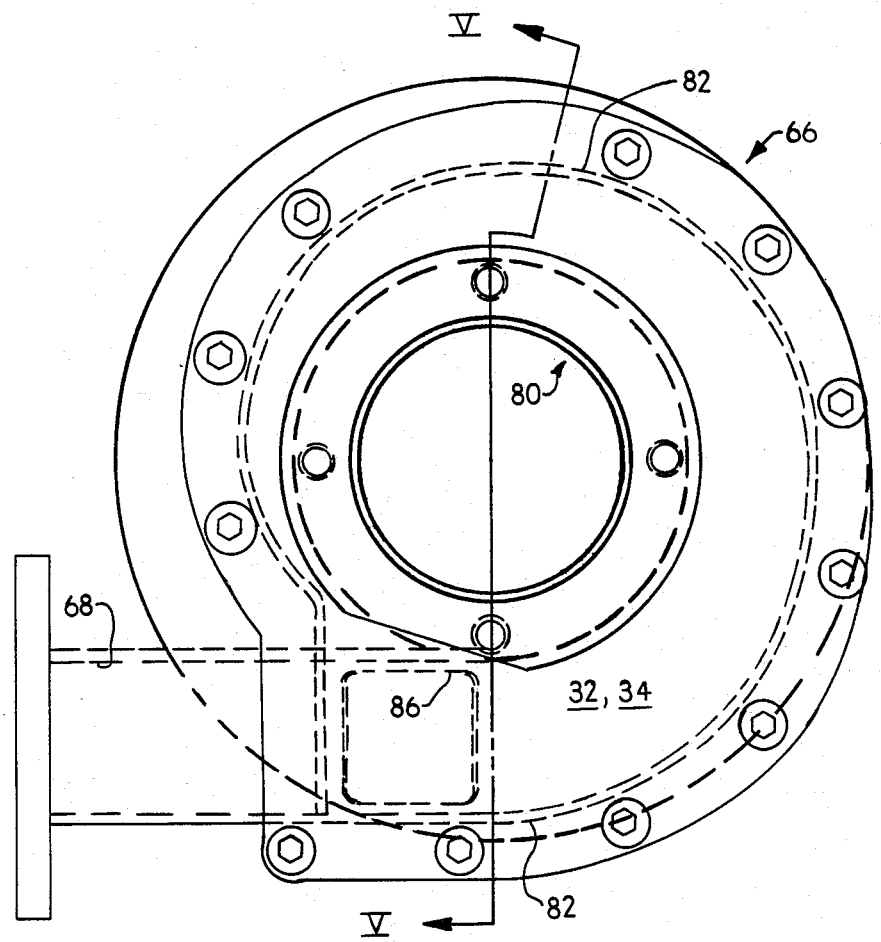
FIG. 3 is a top view of the turbocharger showing the spiral shape of the first and second passages.

Referring first to FIG. 1, an internal combustion engine 16 has an intake manifold 18 through which the air-fuel mixture is carried from a carburetor 20 through the compressor 22 of a turbocharger. A throttle valve 24 regulates the flow of the mixture from the compressor outlet to the engine inlet. Alternatively, the throttle valve may be located ahead of the compressor to control the flow rate of the mixture of the turbine. Exhaust gas produced by the engine is delivered through the exhaust gas manifold 26 to the turbine 28 of the turbocharger. The compressor 22 and turbine 28 are mounted on a common driveshaft 30, such as that described in U.S. patent application Ser. No. 90,950, filed Nov. 5, 1979, now abandoned the entire disclosure of which is herein incorporated by reference.

The turbine housing and rotor are sized so that at low engine speed with the throttle fully open, or nearly so, the rate of exhaust gas flow through the turbine will produce a compressor speed which boosts the pressure within the inlet manifold sufficiently to increase engine power to meet the load demand. The turbine housing, which surrounds the turbine rotor 28, defines a first passage 32 and a second passage 34, the first of these having a substantially smaller cross sectional areas than the second, through which exhaust gas from the engine can enter the turbine. The exhaust manifold 26 is connected to and disconnected from the first and second passages through operation of a flapper valve 36 which is pivoted at 38 and moves in response to the motion of an actuator piston 40. Linear movement of the piston causes valve 36 to move from the position shown in FIG. 1A in solid lines to the position shown in dash lines. The inlet conduit 48 of a directional valve 46 communicates with the inlet manifold, and other conduits 50, 52 connect valve 46 to opposite sides of piston 40. The piston is biased by a spring 54 to the position where flapper valve 36 opens communication between the engine exhaust and the first passage.

The control algorithm, by means of which the state of direction valve 46 is determined, is repetitively executed by a computer 62, whose output produces an electrical current which is applied to the windings of a solenoid 64. The solenoid operates to rotate valve 46 between first and second states shown, respectively, in FIGS. 1A and 1B. The solution of the control algorithm relies on information supplied from an engine speed sensor 60 and an engine intake manifold sensor 44 and other data stored in memory that is accessible to the computer.

The computer 62 can be adapted to store in memory the relationship between the maximum permissible manifold pressure, PMAX, and engine speed, NE, which can be stored in the form of look-up tables that can be consulted to determine the PMAX value corresponding to the current engine speed. Engine speed sensor 60 supplies its output to an input port of the computer and the computer calculates on the basis of this signal the current engine speed. Similarly, the output signal produced by intake manifold pressure sensor 44 is received by the computer as input and used to calculate the current intake manifold pressure. After engine speed is calculated, the corresponding PMAX value is determined from the look-up tables. A maximum part throttle pressure, PPT, is stored in computer memory as a constant value, usually a few inches Hg below atmospheric pressure. The relationship between intake manifold pressure, PIM, and engine speed, which is an accurate measure of the flow rate of exhaust gas from the engine is determined through repetitive solution of the control algorithm shown in FIG. 2.

After the computer determines and stores the values of PMAX, PPT and PIM, a first comparison is made between the magnitudes of PIM and PPT. If PIM is equal to or less than PPT, the computer produces an output signal that is applied to the winding of solenoid 64 to move valve 46 to the position shown in FIG. 1A. If, however, PIM exceeds PPT, a second comparison is made between the magnitude of PIM and PMAX. As a result of the second comparison, if PIM is equal to or less than PMAX, the computer produces an output signal which is applied to the winding of solenoid 64 to move valve 46 to the position shown in FIG. 1A. If, however, as a result of the second comparison, PIM is not equal to or less than PMAX, the computer produces an output signal that is applied to the winding of solenoid 64 so that it moves valve 46 to the position shown in FIG. 1B.

Valve 46, therefore, is moved through operation of the control system to the position shown in FIG. 1B when the intake manifold pressure is greater than PMAX. When valve 46 is in this state, conduit 48 is connected by passage 56 of valve 46 to conduit 52. The high pressure air-fuel mixture within intake manifold 18 moves piston 40 opposite the direction of the force of spring 54 by developing a pressure force on the face of piston 40. This action causes valve 36 to pivot in the direction that closes passage 32 and opens passage 34, thereby slowing the rotational speed of the turbine and compressor. When the compressor speed is slowed, the amount of boost is lowered and the pressure within manifold 18 decreases. As manifold pressure falls below PMAX but remains positive, valve 46 moves to its position shown in FIG. 1A, pressure force on piston 40 overcomes the force of spring 54 and valve 36 closes.

When direction valve 46 is in the position shown in FIG. 1A, intake manifold pressure is either substantially below atmospheric pressure or it is in the range between PPT and PMAX. Execution of the control algorithm determines whether PIM is in this range and, if so, operates to move direction valve 46 to the state shown in FIG. 1A. In that state, conduits 48, 50 and passages 55, 56 communicate intake manifold pressure to the cylinder within which piston 40 moves. When PIM is a vacuum, a condition associated with throttle valve 24 being either closed or only partially open, a force is produced on piston 40 that opposes the force of spring 54, causing valve 36 to close passage 32 and to open passage 34. When valve 36 opens engine exhaust to passage 34, the turbocharger is unable to boost manifold pressure to any significant extent because the flow rate through the turbine is low.

When intake manifold pressure is between PPT and PMAX, the control algorithm operates to move direction valve 46 to the position shown in FIG. 1A. A pressure force of variable magnitude proportional to the magnitude of PIM is produced on piston 40. The pressure force adds to the force of spring 54 when PIM is positive and opposes the force of spring 54 to a negligible extent when PIM is only slightly negative. In either case, piston 40 moves rightward, causing valve 36 to close passage 34 and to open passage 32. This action directs all of the engine exhaust gas through the relatively small cross sectional area of passage 32, increases the speed of the turbine and compressor and produces the maximum boost of which the turbocharger is capable.

Figure 4:
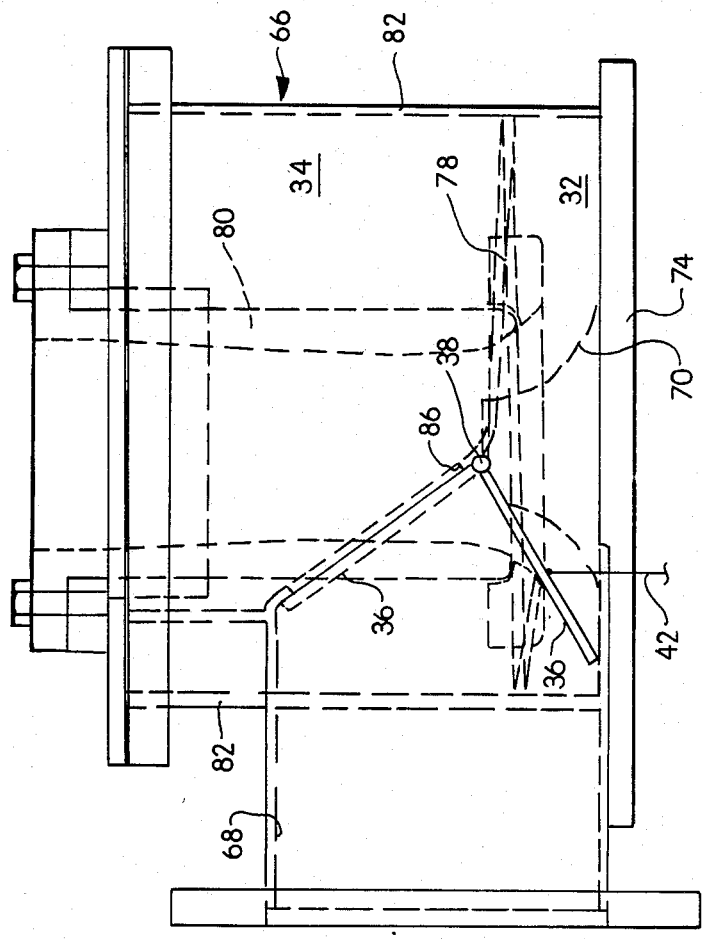
FIG. 4 is a front elevation view of the turbocharger of FIG. 3.
Figure 5:
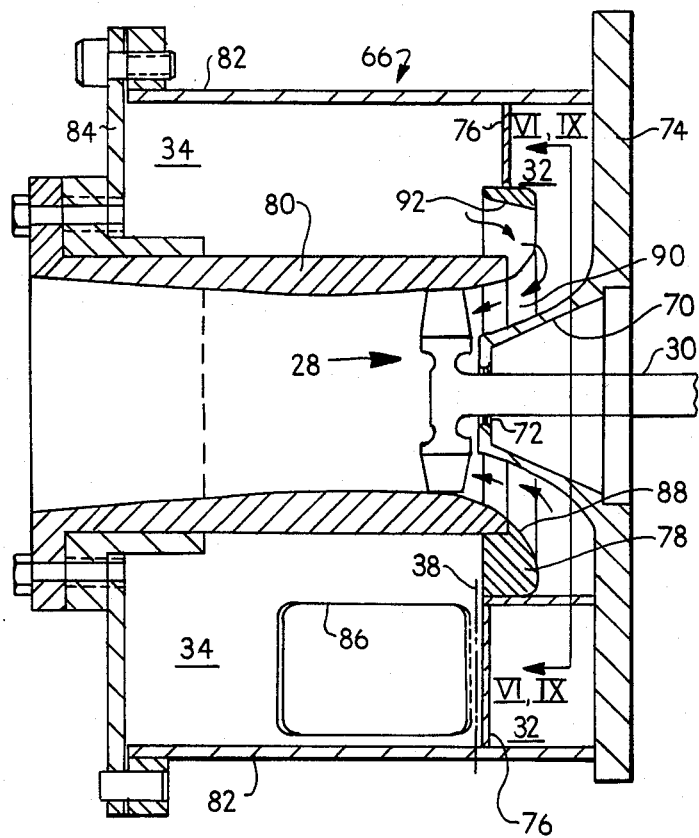
FIG. 5 is a side elevation view partially in cross section of the turbocharger of FIGS. 3 and 4.

Referring now to FIGS. 3, 4 and 5, the turbocharger for use with the control system of this invention has its turbine rotor 28 fixed to the driveshaft 30 for rotation about the axis of the turbocharger. The turbine casing 66 defines a first passage 32 having a relatively small cross sectional flow area and a second passage 34 having a substantially larger cross sectional flow area. These passages are selectively connected to and disconnected from the engine exhaust through the operation of the flapper valve 36. Exhaust gas enters the turbine casing through an inlet passage 68. A bearing housing 70 provides a surface 72 within which bearings which support the driveshaft 30 are located. The bearing housing has an inner face 74 which provides the closure surface for the lower end of passage 32. The upper end of passage 32 is formed by an annular wall 76 and a nozzle box 78. A turbine sleeve 80 carries exhaust gas from the turbine rotor and returns it to the exhaust system of the engine. This sleeve partialy defines the inner wall of passage 34. The upper surface of passage 34 is defined by an end plate 84 that is joined by mechanical attachments to the outer wall 82, which forms the outer surface of passages 32 and 34. The turbine sleeve is joined mechanically to end plate 84 at a bolt circle. FIG. 3 shows that passages 32 and 34 are in the form of spirals that extend from the inlet passage 68 around the circumference of the turbine rotor, the radial dimension of the passages 32, 34 decreasing progressively as the distance from passage 68 increases. FIG. 4 shows valve 36 in solid lines in the position where passage 34 is closed and in dash lines in the position where passage 34 is closed. When passage 32 is closed, passage 34 is opened, and when passage 34 is closed, passage 32 is opened. Movement of valve 36 is made in accordance with motion of actuator piston valve 40, as determined by the solution of the control algorithm previously described. Entrance of the exhaust gas from the entry passage 68 to passage 34 is through a rectangular port 86 formed on an inclined surface at the end of entry passage 68.

In operation, when passage 34 is closed by valve 36 and passage 32 is opened, exhaust gas is directed entirely to the turbine rotor by passing through passage 32 where it attains a substantial swirl velocity having components of velocity in the tangential, radial and axial directions. Nozzle box 78 is formed with a central opening 88 through which the engine exhaust gas passes from passages 32 and 34 through the turbine rotor. The outer surface of the bearing housing 70 provides the radial inner surface of the turbine inlet duct 90. The radially inner surface of turbine sleeve 80 forms a second portion of the radially outer surface of the turbine inlet duct 90. However, when valve 36 closes passage 32 and opens passage 34, exhaust gas from the engine is entirely directed to the turbine through passage 34, slots 92 that are formed in the nozzle box, and turbine inlet duct 90.

Figures 6, 7:
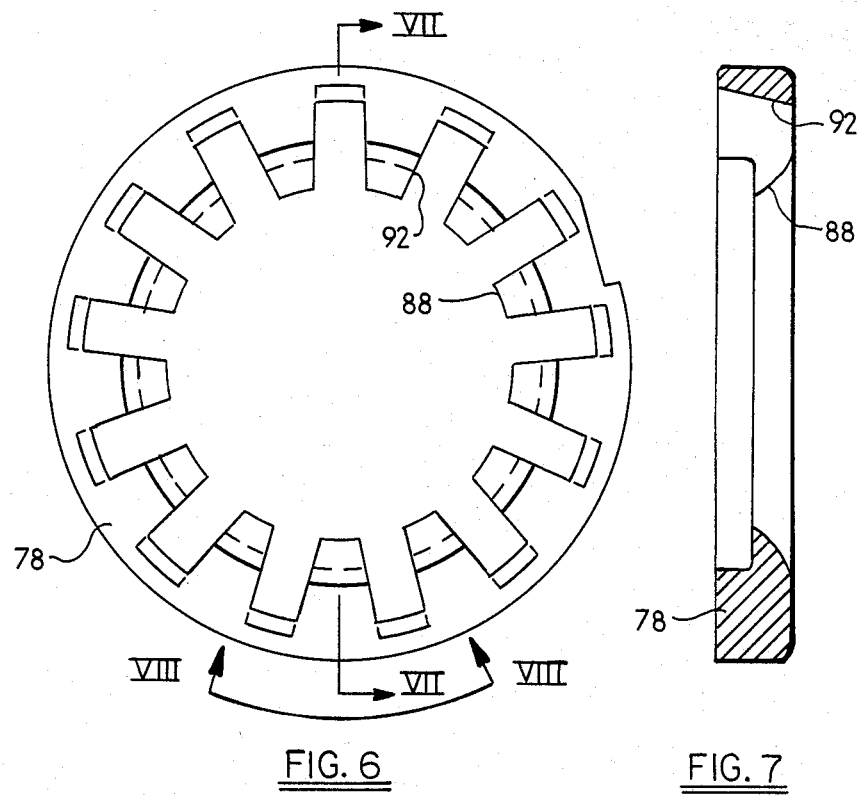
FIG. 6 is a front view taken in the direction VI—VI of FIG. 5 showing the nozzle box.
FIG. 7 is a cross section taken at plane VII—VII of the nozzle box of FIG. 6.
Figures 8, 9:
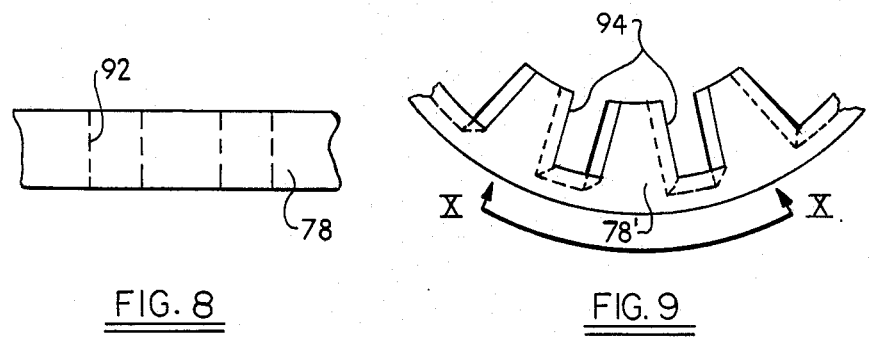
FIG. 8 is a partial edge view taken in direction VIII—VIII of FIG. 6.
FIG. 9 is a partial front view of the nozzle box similar to that of FIG. 6 showing an alternate configuration of the exhaust gas slots formed through the thickness of the nozzle box.
Figure 10:
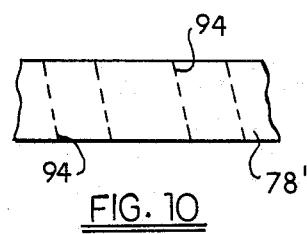
FIG. 10 is a partial edge view taken in direction X—X of FIG. 9.

FIGS. 6, 7 and 8 show one form of the nozzle box having axially directed slots 92 spaced angularly around the turbocharger axis and extending through the thickness of the nozzle box, the slots providing a passage through which the exhaust gas flows from second passage 34 to the turbine. FIGS. 9 and 10 show a second form of the nozzle box 78' in which slots 94 are formed. Slots 94 extend axially through the thickness of the nozzle box, but are directed tangentially as well so that the exhaust gas passing through slots 94 is given a component of swirl velocity before it enters the turbine rotor. The angular direction of slots 94 can be set such that the correct angular relationship of the exhaust gas entering the turbine rotor is made with respect to the velocity component of the turbine rotor.

Having described the preferred embodiment of my invention, what I claim and desire to secure by U.S. Letters Patent is:

1. A turbocharger for boosting the pressure of gas inducted by an internal combustion engine having an exhaust gas outlet comprising:
   a driveshaft mounted for rotation;
   a turbine inlet
   a turbine rotor and a compressor rotor fixed to the driveshaft;
   passage means including first and second passages for connecting the engine exhaust gas outlet to the turbine inlet; and
   closing means for alternately connecting the engine exhaust gas outlet to the first passage and disconnecting the engine exhaust gas outlet to the second passage and for connecting the engine exhaust gas outlet to the second passage and disconnecting the engine exhaust gas outlet to the first passage.

2. The turbocharger of claim 1 wherein the connecting means comprises a wall forming a partition between the first and second passages, the wall having multiple radially directed slots spaced angularly around the turbocharger axis and extending through the wall thickness, the slots providing a passage through which exhaust gas can flow from the second passage to the turbine.

3. The turbocharger of claim 1 wherein the cross sectional flow area of the second passage is substantially larger than that of the first passage.

4. The turbocharger of claim 2 wherein the slots are directed parallel to the axis of the turbine.

5. The turbocharger of claim 2 wherein the direction of the slots through the thickness of the wall has a component directed parallel to the axis of the turbine and a component directed tangentially with respect to the axis of the turbine.

6. The turbocharger of claim 2 wherein the direction of the slots through the thickness of the wall has a component directed parallel to the axis of the turbine, a component directed tangentially with respect to the axis of the turbine and a component directed radially with respect to the axis of the turbine.

7. The turbocharger of claim 1 wherein the opening means comprises:
   a flapper valve movable to a first position where the engine exhaust is connected to the first passage and to a second position where the engine exhaust is connected to the second passage; and
   direction valve means communicating with the engine intake manifold having a first state in which the engine intake manifold pressure causes the flapper valve to move to its first or second positions and having a second state in which engine intake manifold pressure causes the flapper valve to move to its second position.

8. The turbocharger of claim 7 further comprising control means responsive to the magnitude of engine intake manifold pressure for moving the direction valve means to its first state provided the intake manifold pressure is equal to or less than a first predetermined pressure, and for moving the direction valve means to its second state provided the intake manifold pressure is greater than the first predetermined pressure.

9. The turbocharger of claim 7 further comprising actuator means for moving the flapper valve between its first and second positions, having a piston movable within a cylinder in response to the pressure within the engine intake manifold, the cylinder having inlet ports located on opposite sides of the piston, the inlet ports being selectively connected to the engine intake manifold through operation of the direction valve means.

10. The turbocharger of claim 8 wherein the direction valve means includes a valve element having a first passage that connects the engine intake manifold to one side of the piston when the direction valve means is in its first state, and a second passage that connects the engine intake manifold to the opposite side of the piston when the direction valve means is in its second state.

11. The turbocharger of claim 10 wherein the valve element is mounted for rotation between its first and second states and further comprising an electrical solenoid adapted to rotate the valve element between its first and second states.

12. The turbocharger of claim 8 wherein the control means includes:

means for repetitively determining the pressure within the engine intake manifold, PIM;

means for repetitively determining the engine speed;

computing means provided with a data base that includes the maximum engine intake manifold pressure, PMAX, and the part throttle engine intake manifold pressure, PPT;

means for repetitively comparing in the computing means at frequent intervals the magnitudes of PIM and PPT and the magnitudes of PIM and PMAX; and means for moving the direction valve means to the first state if PIM is equal to or less than PIM, and for moving the direction valve means to the second state if PIM is greater than PMAX.

13. The turbocharger of claim 12 wherein the means for moving the direction control valve includes an electrical solenoid adapted to change the state of the direction control valve in accordance with the results of said comparisons.

14. The turbocharger of claim 12 wherein the computing means further comprises:

a data base that includes the relationship between the engine intake manifold pressure, PMAX, and the engine speed, NE;

means for repetitively determining in the computer at frequent intervals the PMAX value that corresponds to the engine speed; and means for moving the direction valve means to the first state if PIM is equal to or less than PPT and if PIM is greater than PPT but equal to or less than the PMAX value, and for moving the direction valve means to the second state if PIM is greater than the PMAX value.

* * * * *